United States Patent [19]

Mahoney

[11] Patent Number: 5,280,230
[45] Date of Patent: Jan. 18, 1994

[54] AUTOMATIC NICKEL CADMIUM BATTERY CYCLER

[76] Inventor: Michael B. Mahoney, 8403 Greenbelt RD. #202, Greenbelt, Md. 20770

[21] Appl. No.: 907,744

[22] Filed: Jun. 29, 1992

[51] Int. Cl.$^5$ ............................................. H02J 7/04
[52] U.S. Cl. ............................................. 320/14
[58] Field of Search ............................................. 320/14

[56] References Cited

U.S. PATENT DOCUMENTS

| | | | |
|---|---|---|---|
| 4,755,733 | 7/1988 | Laliberté | 320/14 X |
| 4,829,225 | 5/1989 | Podrazhansky et al. | 320/14 |
| 5,159,258 | 10/1992 | Kolvites et al. | 320/14 |

*Primary Examiner*—R. J. Hickey

[57] ABSTRACT

An electronic device for automatically discharging and charging nickel cadmium batteries. When used regularly the device will prevent 'memory' from developing in nickel cadmium cells. The prevention of memory development greatly increases the batteries' useful life and provides for predictable performance. The device is simple to operate, requires no technical knowledge on the part of the user, is completely automatic requiring no monitoring while the device functions, and is relatively inexpensive. The device is intended to replace the standard battery charger while providing a most useful function in addition to charging alone.

The device discharges a battery or multiple configuration of batteries (battery packs) to a very specific level and then automatically charges the batteries at a slow rate. Charge and discharge rates are low to preclude damage to the batteries. The device employs a precision voltage reference which is used to compare against the discharging batteries' voltage to sense exactly when to exit discharge and enter charge. The precision voltage reference is also utilized to compare against the charging batteries' voltage so as to indicate when the battery has reached the full charge state. An indicating means is also provided to indicate that discharge is active. The device includes a simple means for disabling the discharge mode so as to function as a charger only and includes a means for restarting the discharge mode at any time.

5 Claims, 5 Drawing Sheets

AUTOMATIC NICKEL CADMIUM BATTERY CYCLER

BACKGROUND OF THE INVENTION

1. Field of the Invention

The present invention relates to an electronic device for cycling rechargeable batteries and specifically to an electronic device for the automatic discharging and charging of nickel cadmium batteries.

2. Description of the Prior Art

Nickel cadmium batteries exhibit a phenomenon termed "memory" (subsequently described) when the batteries are repeatedly charged at a high rate after being only partially discharged. The development of the memory effect is accelerated when the depth of discharge is low and the rate of charge is high.

Memory in nickel cadmium batteries is the premature drop in the batteries' nominal discharge curve which seriously degrades the batteries' usefulness in terms of performance predictability and life. Memory can usually be removed from nickel cadmium batteries by repeated cycling of the batteries, i.e., discharging the batteries to the proper level and then recharging them at a slow rate. However, the memory effect can be avoided altogether by properly cycling the batteries on a regular basis from the beginning. This will greatly increase the batteries' life as well as enable them to perform predictably. The present invention provides a simple, low cost means for accomplishing nickel cadmium battery cycling.

Numerous devices exist which perform the discharging and charging of nickel cadmium batteries but these devices are complicated and require technical knowledge on the part of the consumer. The level of sophistication of these existing devices drives a high consumer cost which imparts reluctance onto the consumer to purchase the device. The present invention requires no technical knowledge to operate, is completely automatic, and is relatively inexpensive.

During the patent search, one particular issued patent bore some similarity to the present invention and is discussed in detail below.

Reference U.S. Pat. No. 4,517,517 to Kinney. The first major shortcoming of the reference patent is that the controlling circuitry is powered from the battery under test (block 10$a$). The operational amplifier, $\mu$A 741, has a finite range of supply voltages required for proper operation. If the voltage of the battery under test falls below this finite range or exceeds this finite range, the operational amplifier will not function rendering the circuit inoperative. Furthermore, a specific voltage range must be maintained across the Zener diode Z1 in order to maintain it in reverse bias. Again, if the voltage of the battery under test falls below or rises above this specific range, the Zener diode will not function rendering the circuit inoperative. The present invention differs from the reference patent in this regard in that the controlling circuitry is powered by an autonomous power supply and not by the battery to be cycled.

Secondly, the reference patent does not provide a means for automatically entering the charge mode upon termination of the discharge cycle; this must be effected manually by an operator or user, which requires constant monitoring of the device while in operation. The present invention automatically enters the charging mode upon completion of the discharge cycle and requires no user intervention or monitoring whatsoever.

Thirdly, the reference patent does not provide a means for completely isolating the battery under test from the circuit upon completion of the discharge cycle; the battery under test remains loaded by the circuit. This continues to discharge the battery, however, at a slower rate, and, if left unattended, would eventually completely discharge the battery and possibly damage the battery permanently. Since the present invention automatically switches into the charge mode upon completion of the discharge mode, the possibility of complete battery discharge is eliminated.

The present invention is a great departure from the reference patent and the present invention is far superior to the reference patent with regard to any similarities between the two.

SUMMARY OF THE INVENTION

The terms 'battery' or 'batteries' as used hereinafter refer to the battery or batteries to be discharged and charged and are not to be confused with the autonomous power supply herein referred to as 'Supply Voltage'.

The invention is an electronic device which cycles nickel cadmium batteries; i.e., an automatic battery discharger and charger. The batteries are discharged to a very specific voltage level and then automatically charged at a slow rate of charge to preclude overcharging. The invention employs a precision voltage reference to which the discharging batteries' voltage is continuously compared so as to preclude over-discharging and to sense exactly when to exit the discharge mode and enter the charge mode. The precision voltage reference is also employed in monitoring the batteries' voltage under charge so as to give indication when the charged batteries have reached their nominal fully charged voltage. Charge and discharge rates, calculated upon the batteries' nominal voltage and amp-hour capacity, are such that the device can cause no damage whatsoever to the batteries from over-discharge, overheating from high discharge rates, overcharge, and venting from high charge rates.

It is an object of the invention:

to provide a low cost, highly reliable, and accurate means for performing nickel cadmium battery cycling;

to provide a completely automatic means for performing the cycling of nickel cadmium batteries which requires no intervention or technical knowledge on the part of the user;

to replace the standard battery charger while providing a very useful function in addition to just charging alone;

to also function in a charge only mode by providing a simple means for disabling the discharge mode;

to be configured during manufacture to be compatible with a limitless range of battery voltages, amp-hour capacities, and parallel and/or serial multiple battery configurations (battery packs) while still maintaining the preferred embodiment;

to be configured during manufacture to accommodate a means of selecting one of many different battery specifications (voltages and amp-hour capacities); and to combine multiple circuits of the preferred embodiment into one circuit, sharing common components, with each circuit functioning independently of the other, in order to simultaneously cycle multiple batteries or multiple packs of batteries.

DETAILED DESCRIPTION OF THE PREFERRED EMBODIMENT

Figure 1:
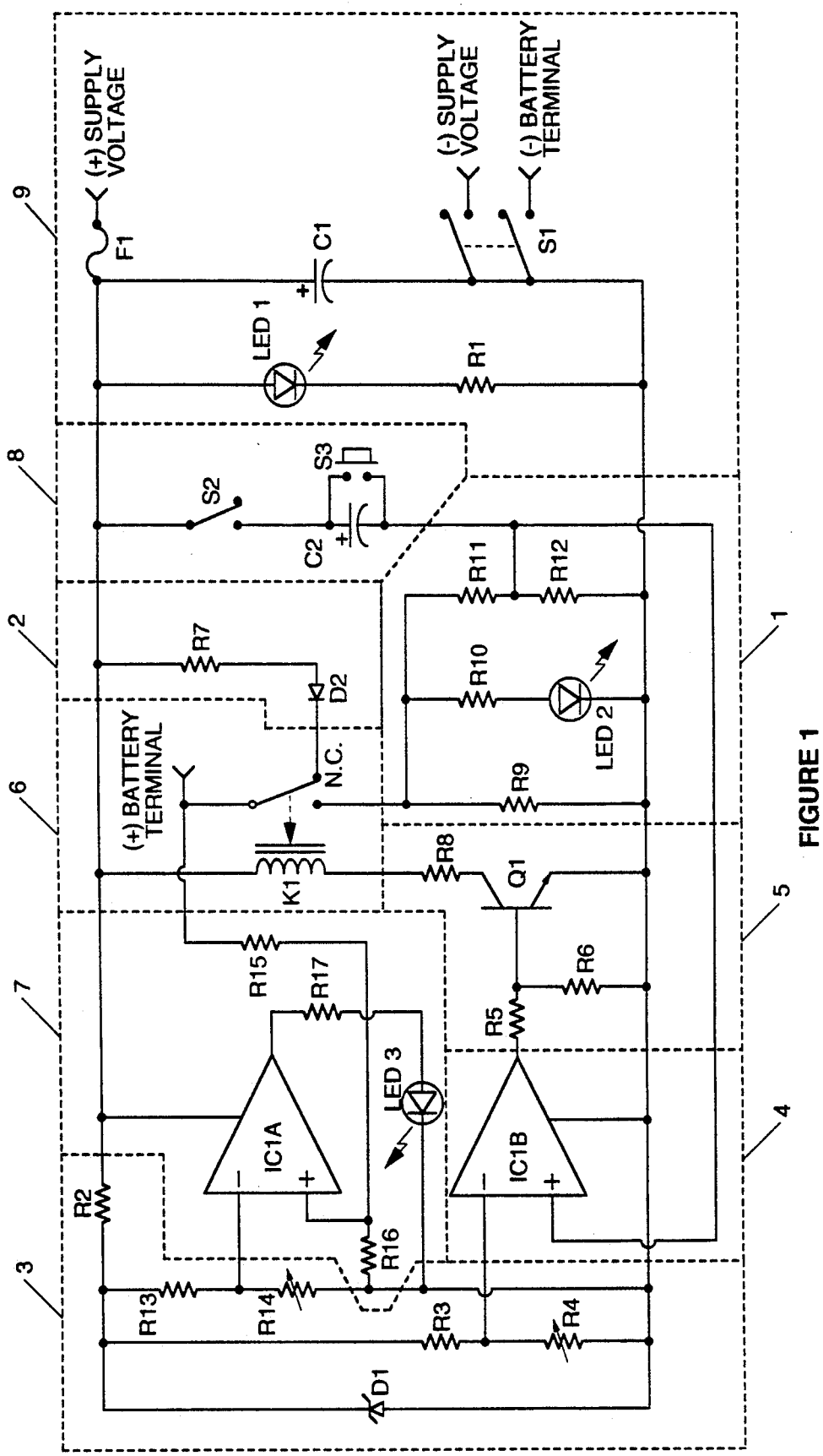
FIG. 1 is a schematic diagram of the preferred embodiment.

Reference FIG. 1. FIG. 1 has been subdivided into 9 separate functional sections for a clearer presentation of the operation of the Automatic Nickel Cadmium Battery Cycler. Each of these blocks are summarized as follows:

Section 1 comprises the discharge components; namely, discharge resistor R9, discharge active Light Emitting Diode LED 2, LED current limiting resistor R10, and the battery discharge voltage divider network of R11 and R12.

Section 2 comprises the charge components; namely, charge resistor R7 and charge direction diode D2.

Section 3 comprises the precision voltage reference and reference voltage dividers components; namely, precision voltage reference Zener diode D1, Zener diode current limiting resistor R2, discharge cutoff reference voltage divider network R3 and R4, and full charge reference voltage divider network R13 and R14. Note R4 and R14 are variable resistors.

Section 4 comprises the discharge mode operational amplifier IC1B.

Section 5 comprises the relay driver components; namely, transistor Q1, transistor base bias resistors R5 and R6, and transistor collector resistor R8.

Section 6 comprises the charge/discharge mode control switching component, relay K1, and battery positive terminal connection (+) Battery Terminal.

Section 7 comprises the fully charged indicator components; namely, operational amplifier IC1A, fully charged Light Emitting Diode LED 3, LED current limiting resistor R17, and battery charge voltage divider network R15 and R16.

Section 8 comprises the manual mode control components; namely, CHARGE ONLY/CYCLE mode control switch S2, auto discharge on power up capacitor C2, and DISCHARGE RESTART push button switch S3 (normally open, momentary closure).

Section 9 comprises the power control components; namely, fuse F1, power ON/OFF switch S1, Supply Voltage filter capacitor C1, power on Light Emitting Diode LED 1, LED current limiting resistor R1, battery negative terminal connection (−) Battery Terminal, and Supply Voltage connections (+) Supply Voltage and (−) Supply Voltage.

Specific component values have been omitted from FIG. 1 since they are unnecessary for the description of the circuit's operation.

Figure 2:
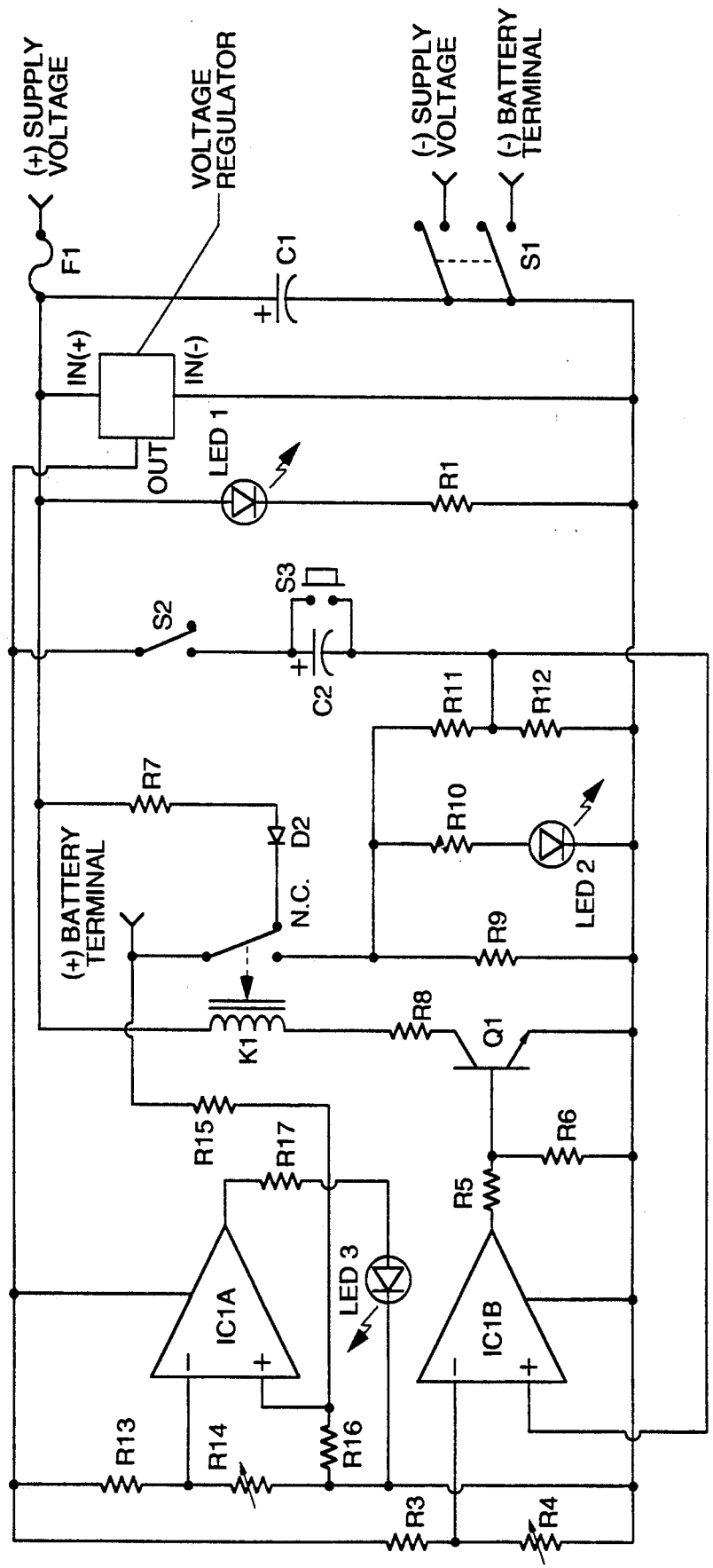
FIG. 2 is a schematic diagram of an alternate embodiment wherein a voltage regulator is utilized to supply voltage to certain components due to the high Supply Voltage required for the cycling of high voltage nickel cadmium batteries or packs of batteries.

DC voltage for powering the Automatic Nickel Cadmium Battery Cycler circuit and supplying charging current for the battery is supplied to Section 9 through fuse F1 and switch S1. Fuse F1 provides protection against overload. Switch S1 also connects the (−) Battery Terminal into the circuit. When switch S1 is open (power OFF) the battery is isolated from the circuit and therefore may be left connected to the Automatic Nickel Cadmium Battery Cycler when power is switched OFF with no adverse effects. Capacitor C1 provides a filtering action to the Supply Voltage entering the circuit. Light Emitting Diode LED 1 illuminates whenever power is applied to the circuit (S1 closed). Resistor R1 provides current limiting protection to LED 1. Power is supplied to the operational amplifier (IC1A and IC1B) through the +Vs and −Vs terminals. If required, for high voltage applications, a voltage regulator may be employed within the circuit to power the operational amplifier when the Supply Voltage exceeds the maximum required for the operational amplifier as shown in FIG. 2.

Reverse bias voltage is placed across Zener diode D1 and said Zener diode is protected from over current damage by resistor R2. The precision reference voltage across Z1 is placed across the discharge cutoff reference voltage divider network of R3 and R4. R4 is adjustable and is calibrated during manufacture to output the precise voltage required into the (−) input of IC1B. The precision reference voltage across Z1 is also placed across the full charge reference voltage divider network of R13 and R14. R14 is adjustable and is calibrated during manufacture to output the precise voltage required into the (−) input of IC1A.

If switch S2 is open (the CHARGE ONLY mode) when power is applied to the circuit the device defaults into the charge mode. In this configuration, no voltage is present at the (+) input of IC1B. Since the (−) input of IC1B is higher than the (+) input of IC1B, the output of IC1B is low and therefore transistor Q1 does not conduct keeping relay K1 de-energized. Charging current, therefore, flows into the battery from the (+) Supply Voltage, R7, D2, the normally open and common contacts of K1, and through the (+) Battery Terminal connection. Charge current is controlled by charge resistor R7. Charge direction diode D2 provides a safety feature that if the Supply Voltage were to fail the battery will not discharge back into the circuit. The voltage present at the (+) Battery Terminal is the voltage across the battery and is connected across the battery charge voltage divider network of R15 and R16. The output of this divider network feeds the (+) input if IC1A. When the output of the divider network of R15 and R16 exceeds output of the full charge reference voltage divider network, the output of IC1A goes high and therefore illuminates Light Emitting Diode LED 3 with current limit protection to LED 3 provided by resistor R17. This indicates a fully charged battery. The charge rate is low enough that the battery may be left on charge for extended periods without damage to the battery.

If switch S2 is closed (the CYCLE mode) when power is applied to the circuit the capacitor C2 will charge through the network of resistors of Section 1.

The instant C2 begins to charge a voltage pulse equal to the (+) Supply Voltage appears at the (+) input of IC1B by virtue of the connection between the negative pole of C2 and the (+) input of IC1B. This voltage pulse briefly exceeds the discharge cutoff reference voltage at the (−) input of IC1B and causes the output of IC1B to go high turning on transistor Q1 via the transistor base bias network of R5 and R6. Current, therefore, flows through relay K1 energizing the relay and pulling in the contacts. Collector resistor R8 is provided to limit the current allowed to pass through K1 and Q1.

Once the contacts of K1 pull in, the battery voltage is placed across discharge resistor R9 and discharge begins. Battery voltage is also applied across the battery discharge voltage divider network of R11 and R12. The output of this voltage divider feeds the (+) input of IC1B. As long as the output of the battery discharge voltage divider present at the (+) input of IC1B is higher than the discharge cutoff reference voltage present at the (−) input of IC1B, the output of IC1B remains high and the discharge mode is maintained. Discharge active Light Emitting Diode LED 2 is illuminated during the discharge mode by virtue of the battery voltage being present at R10 which provides current limit protection to LED 2.

When the output of the battery discharge voltage divider present at the (+) input of IC1B eventually falls below the discharge cutoff reference voltage present at the (−) input of IC1B, the output of IC1B goes low turning off Q1 and therefore de-energizing relay K1. The contacts of K1 fall out and the charge mode is automatically entered.

If switch S3 (DISCHARGE RESTART) were now pressed a voltage pulse would appear at the (+) terminal of IC1B and the discharge mode would be entered again as previously described. Switch S3 simulates the voltage pulse produced by the charging of capacitor C2 and provides a means for manually restarting the discharge cycle.

Figure 3:
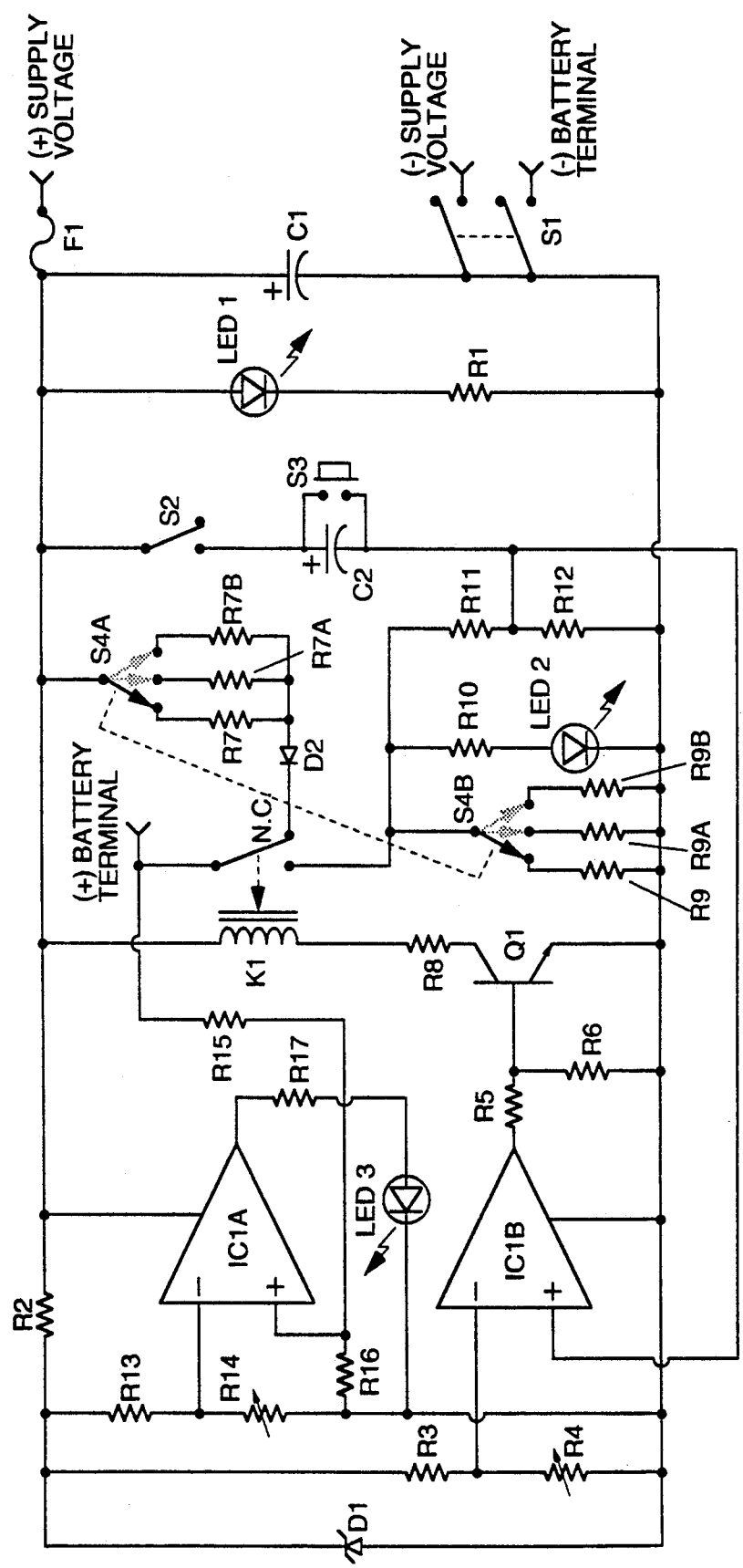
FIG. 3 is a schematic diagram of an alternate embodiment employing a means for selecting one of a multiple of specific battery voltages and amp-hour capacities of which to cycle.

The alternate embodiment of FIG. 3 operates identically to that of the preferred embodiment as described above with the exception that switch S4 (comprised of S4A and S4B) may be used to select the rate at which the battery is charged and discharged. The values of the additional charge resistors R7A and R7B and the additional discharge resistors R9A and R9B are chosen to coincide with batteries of different voltages and/or amp-hour capacities. This alternate embodiment enhances the flexibility of the device. The number of selectable charge and discharge rates for which a particular embodiment can be configured for is not limited to three as depicted in FIG. 3.

Figure 4:
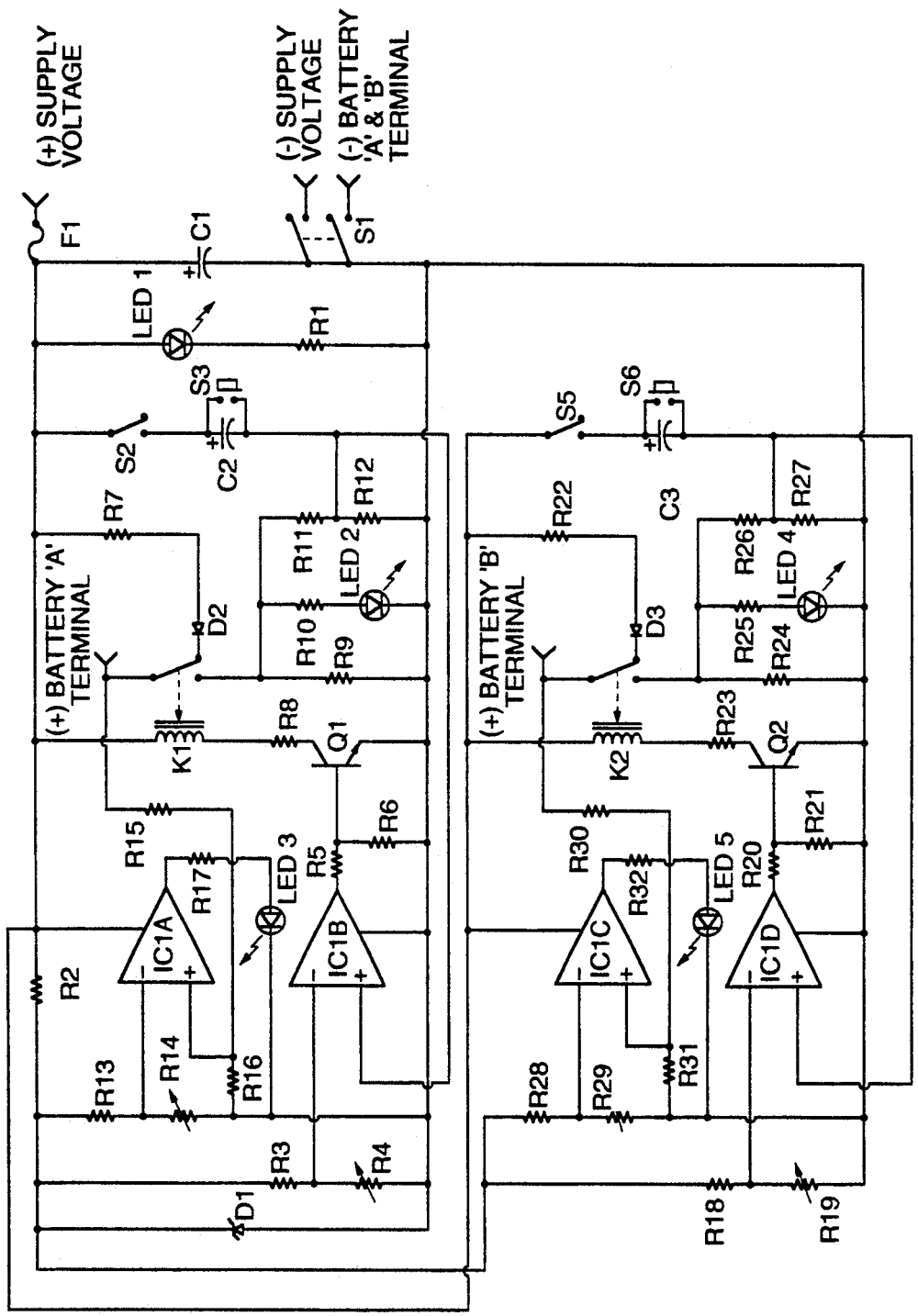
FIG. 4 is a schematic diagram of an alternate embodiment which combines multiple circuits of the preferred embodiment into one circuit, sharing common components, to perform the simultaneous, independent cycling of individual batteries.

The alternate embodiment of FIG. 4 is two circuits of the preferred embodiment which share a common Zener diode Z1 and common Supply Voltage. Operation of this alternate embodiment is identical to the preferred embodiment but allows two batteries or packs of batteries to be independently cycled. This use of multiple circuits is not limited to two as presented in FIG. 4.

Figure 5:
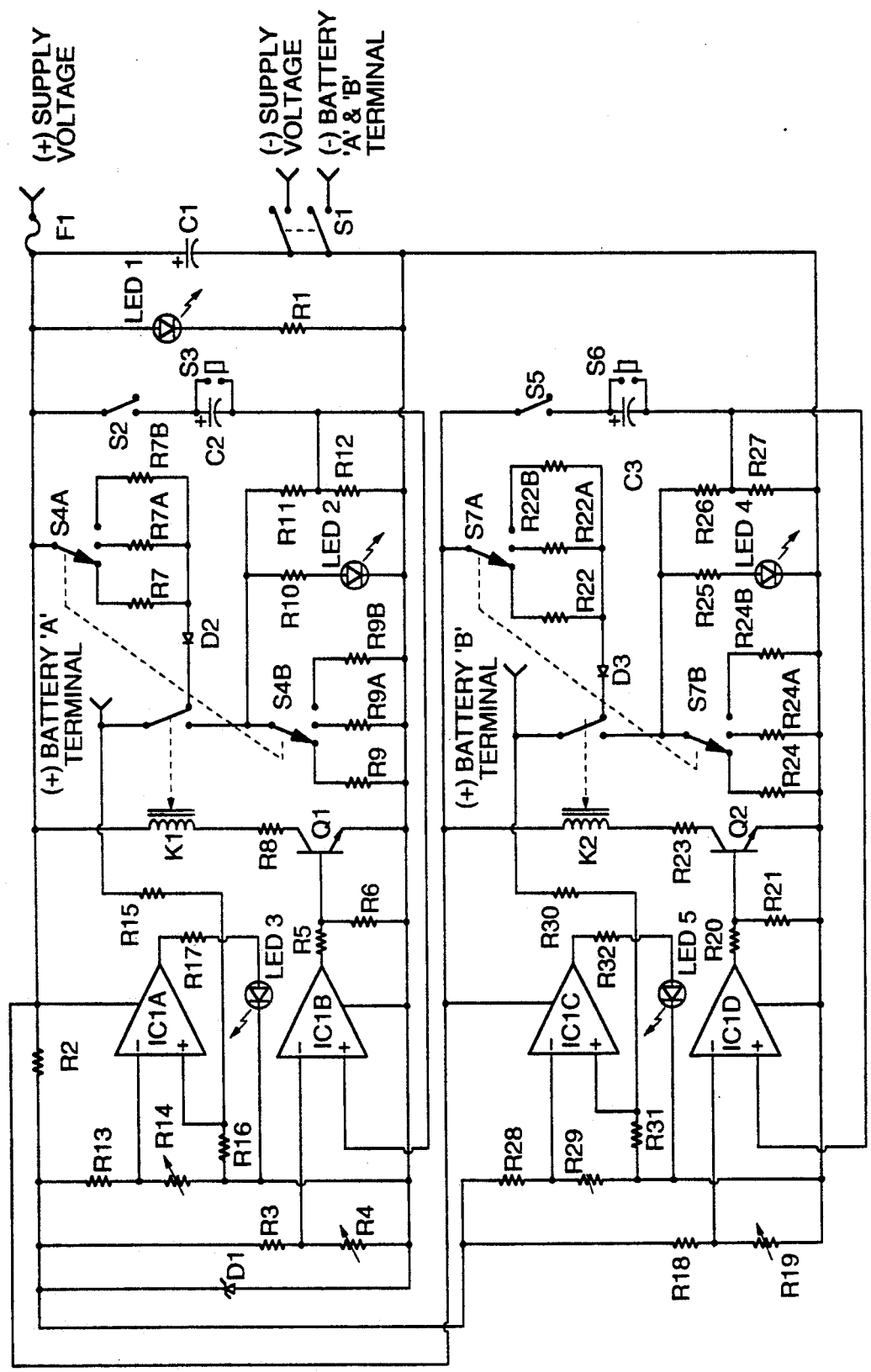
FIG. 5 is a schematic diagram of an alternate embodiment wherein the concepts of FIG. 3 and FIG. 4 are combined.

The alternate embodiment of FIG. 5 is two circuits of the alternate embodiment as presented in FIG. 3. Again, operation of the circuits is identical to the preferred embodiment but maximum flexibility is attained in this embodiment.

While there have been shown and described what are the preferred embodiments of the present invention, it will be appreciated by those skilled in the art that modifications of such embodiments may be made. It is therefore desired that the invention not be limited to those embodiments, and it is intended to cover in the appended claims all such modifications as fall within the true spirit and scope of the invention.

I claim:

1. An electronic, automatic nickel cadmium battery discharging and charging device comprising in combination:

a means for connecting a battery or batteries to be discharged and charged to the device whose terminals are designated (+) Battery Terminal and (−) Battery Terminal and which are referred to collectively as Battery Terminals, the potential of which is referred to as Battery Voltage;

a means for connecting a direct current power supply to the device whose terminals are designated (+) Supply Voltage and (−) Supply Voltage whose potential is referred to as Supply Voltage;

a first section including a first current producing means which connects across said Battery Terminals to perform the discharging function, a first voltage divider connected across said Battery Terminals having an output, and an indicating means to indicate that Battery Voltage is present across said first current producing means;

a second section including a second current producing means which connects across the (+) Supply Voltage and the (+) Battery Terminal to perform the charging function;

a third section including a means for providing a precision reference voltage and a second and third voltage divider, each having an output, each connected across said precision reference voltage and said (−) Supply Voltage;

a fourth section including a first comparing means having at least two inputs and at least one output where the non-inverting input of said first comparing means is the output of said first voltage divider of the first section and the inverting input is the output of said second voltage divider of the third section whereby the output of said first comparing means is sensitive to reduced Battery Voltage providing a signal for the termination of the discharging function;

a fifth section including a current switching means having an input and an output whose input is connected to the output of said first comparing means of the fourth section;

a sixth section including a switching means having a controlling input connected to the output of said current switching means of the fifth section which controls the ON/OFF state of said switching means and having switching terminals whose common terminal is connected to the (+) Battery Terminal, whose normally open (ON) terminal connects said (+) Battery Terminal to said first current producing means of the first section and whose normally closed (OFF) terminal connects said (+) Battery Terminal to said second current producing means of the second section whereby controlling the charge and discharge function of the device;

a seventh section including a second comparing means having at least two inputs and at least one output, a fourth voltage divider having an output, said fourth voltage divider being connected across said (+) Battery Terminal and (−) Supply Voltage whose output is connected to the inverting input of said second comparing means, an indicating means connected to the output of said second comparing means; the non-inverting input of said second comparing means connected to the output of said third voltage divider of the third section whereby said second comparing means is sensitive to an increased Battery Voltage and giving indication as such;

an eighth section section including a switching means with one end connected to the (+) Supply Voltage and the other end connected to a capacitive means that is in parallel with a momentary closure switching means which in turn is connected to the non-inverting input of said first comparing means of the fourth section providing a means for enabling or disabling the discharge function of the device;

a ninth section including a fusing means connected between the device and either the (+) Supply Voltage or (−) Supply Voltage, an indicating means connected across the Supply Voltage, a capacitive means connected across the Supply Voltage, and a switching means for interrupting the Supply Voltage to the device and for disconnecting said battery from the device.

2. A device as defined in claim 1 where said first and second comparing means and said precision reference voltage may be powered directly from the Supply Voltage or by an additional voltage regulating whose input is the Supply Voltage and whose output is a regulated voltage.

3. A device as defined in claim 1 where the Supply Voltage is direct current voltage and may be supplied by source battery, rectified alternating current, photovoltaic cells, generator, or other direct current voltage source means.

4. A device as defined in claim 1 where multiple current producing means in the first and second sections may be selected by the addition of a selection means in the first and second sections enabling the device to function properly with a variety of batteries of varying capacities.

5. A device as defined in claim 1 where the momentary closure switching means of the eighth section may be used as a signal to start a timing means and where the change of state of the output of said first comparing means from 'high' to 'low' may be used as a signal to halt said timing means.

* * * * *